(12) United States Patent
Herold, III et al.

(10) Patent No.: US 7,434,877 B2
(45) Date of Patent: Oct. 14, 2008

(54) TRANSPORTATION SEATING SYSTEM

(75) Inventors: Bernard A. Herold, III, Grandville, MI (US); David I. Wolf, Cedar Springs, MI (US); Douglas L. Fassett, Kentwood, MI (US); Trevor R. Haney, Jenison, MI (US); Douglas G. Oswald, Grand Rapids, MI (US); Brady A. Olason, Mukilteo, WA (US); Jeffrey D. Allison, Lake Oswego, OR (US); Scott A. MacInnes, Issaquah, WA (US); Nino Senoadi, Bothell, WA (US)

(73) Assignee: American Seating Company, Grand Rapids, MI (US)

( * ) Notice: Subject to any disclaimer, the term of this patent is extended or adjusted under 35 U.S.C. 154(b) by 230 days.

(21) Appl. No.: 11/234,602

(22) Filed: Sep. 23, 2005

(65) Prior Publication Data

US 2007/0069558 A1 Mar. 29, 2007

(51) Int. Cl.
*A47C 15/00* (2006.01)
*A47C 7/02* (2006.01)
(52) U.S. Cl. .................. 297/232; 297/452.39; 297/248
(58) Field of Classification Search ............. 297/452.2, 297/419, 248, 16.1, 216.2, 316, 344.15, 232, 297/420, 158.2, 14, 452.39; 16/223, 340; 403/295, 205; 52/281
See application file for complete search history.

(56) References Cited

U.S. PATENT DOCUMENTS

| | | | |
|---|---|---|---|
| 126,429 A * | 5/1872 | Wadsworth | 297/451.4 |
| 1,049,338 A * | 1/1913 | Butterworth | 297/43 |
| 2,845,111 A | 7/1958 | Barecki et al. | |
| 3,261,640 A | 7/1966 | Straits | |
| 3,393,941 A | 7/1968 | Grosfillex | |
| 3,586,371 A | 6/1971 | Baetzner | |

(Continued)

OTHER PUBLICATIONS

"Freedman CitiSeat Transit Collection" Flyer Published by Freedman Seating Company. Acknowledged as prior art.

(Continued)

*Primary Examiner*—Sarah B McPartlin
(74) *Attorney, Agent, or Firm*—Warner Norcross & Judd LLP

(57) ABSTRACT

The specification discloses a modular transportation seating assembly that includes a support frame and seats mounted on the frame. The frame includes a seat beam and a cantilever beam. The cantilever beam includes a body and a connector inserted into the body and held together by compressive force. The body has an end defining a plurality of receivers, and the connector includes a plurality of lugs each received within one of said receivers. The seat beam includes a body, a tee nut slidably received within the body, a second connector outside the body, and a fastener intersecuring the two connectors to retain them in position along the length of the body. A single fastener intersecures the connectors on the seat beam and the cantilever beam. The seat includes a flange hooked about the back edge of the seat beam and one or more fasteners connecting the seat to the forward edge of the seat beam. The backs of adjacent seats define a vee, and a seat tie fills the lower portion of the vee to prevent objects from accidentally catching in the vee. The seats are molded and can include an integrally molded grab rail.

11 Claims, 20 Drawing Sheets

U.S. PATENT DOCUMENTS

| | | | |
|---|---|---|---|
| 3,747,979 A | 7/1973 | Barecki | |
| 3,826,206 A * | 7/1974 | Ruggles | 108/64 |
| 3,951,454 A | 4/1976 | Tantlinger | |
| RE29,271 E | 6/1977 | Barecki | |
| 4,036,527 A | 7/1977 | Faul | |
| 4,060,279 A | 11/1977 | Vogel | |
| 4,110,052 A * | 8/1978 | Polvara | 403/295 |
| 4,118,062 A | 10/1978 | Harder, Jr. et al. | |
| RE30,871 E | 2/1982 | Harder, Jr. | |
| 4,673,308 A * | 6/1987 | Reilly | 403/172 |
| 4,730,873 A | 3/1988 | Janz | |
| 4,732,359 A | 3/1988 | Danton | |
| 4,890,884 A | 1/1990 | Olson | |
| 4,955,973 A * | 9/1990 | Provencher | 296/65.07 |
| 5,056,848 A | 10/1991 | Fekete et al. | |
| 5,082,320 A | 1/1992 | Danton | |
| 5,470,128 A | 11/1995 | Kerkham | |
| 5,655,816 A | 8/1997 | Magnuson et al. | |
| 5,839,787 A | 11/1998 | Magnuson et al. | |
| 6,024,024 A | 2/2000 | Favaretto | |
| 6,095,603 A * | 8/2000 | Hock | 297/232 |
| 6,273,510 B1 | 8/2001 | Ehemann | |
| 6,565,152 B2 | 5/2003 | Craft et al. | |
| 6,729,244 B2 | 5/2004 | Cattaneo | |
| 6,840,698 B2 | 1/2005 | Cattaneo | |
| 6,846,044 B2 | 1/2005 | Moffa et al. | |
| 6,974,184 B1 * | 12/2005 | Moffa et al. | 297/14 |
| 2004/0182276 A1 * | 9/2004 | Gelbert | 105/345 |

OTHER PUBLICATIONS

"Feather Weight Foldaway BV & AM Styles" Flyer Published by Freedman Seating Company. Acknowledged as prior art.

Photograph of the "Aries" seating system sold by USSC Group. Acknowledged as prior art.

\* cited by examiner

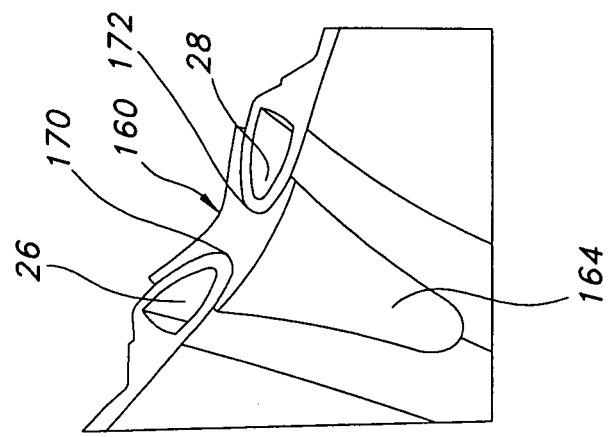
FIG. 24
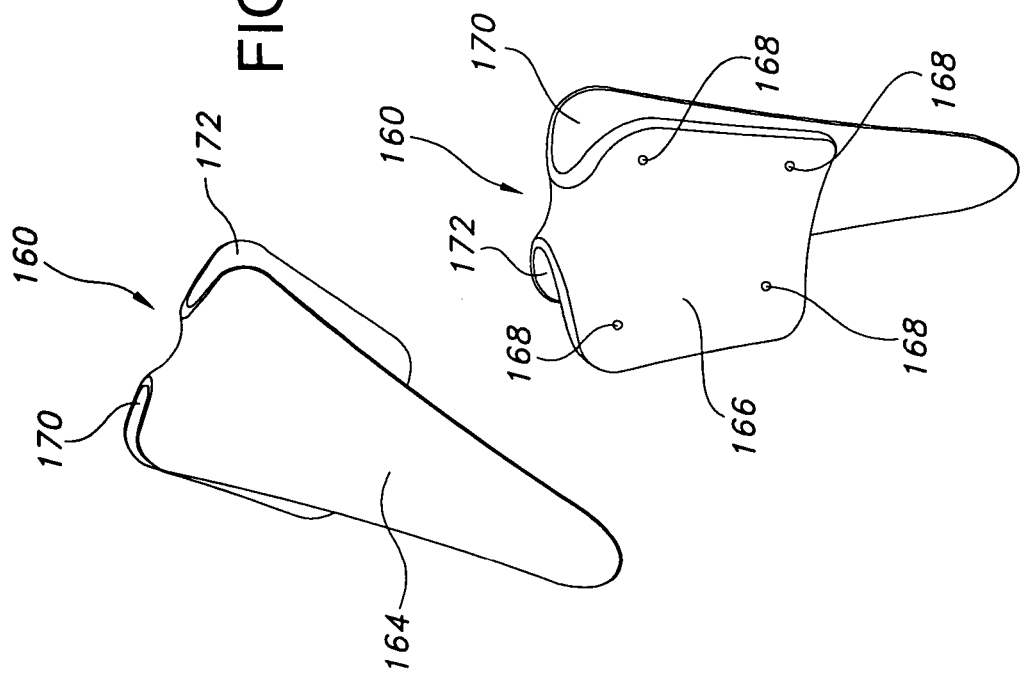
FIG. 22
FIG. 23

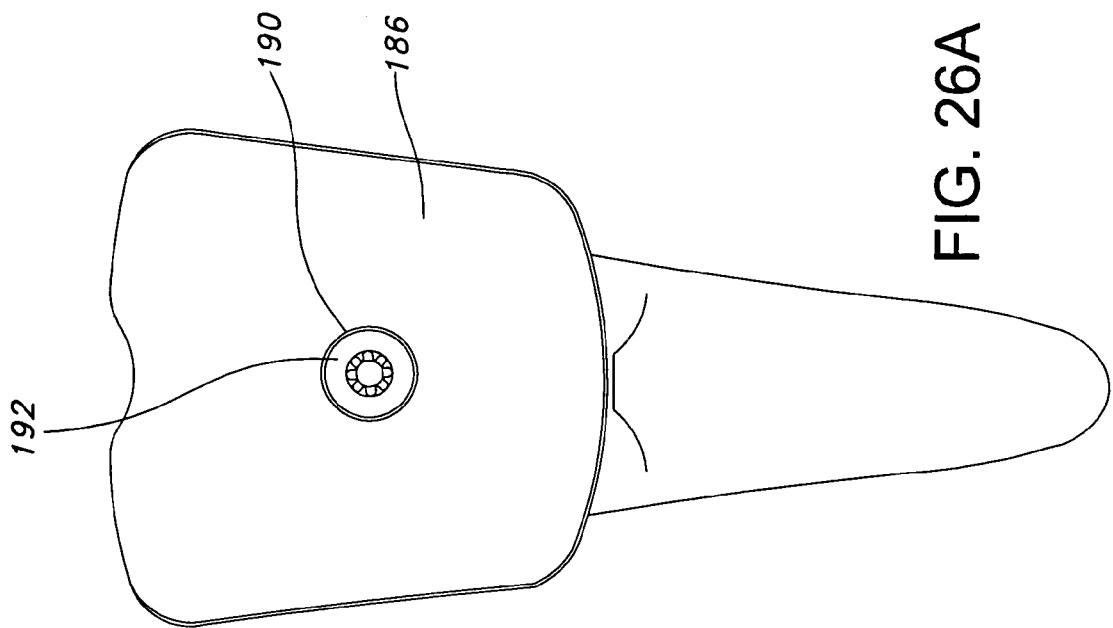
FIG. 26A
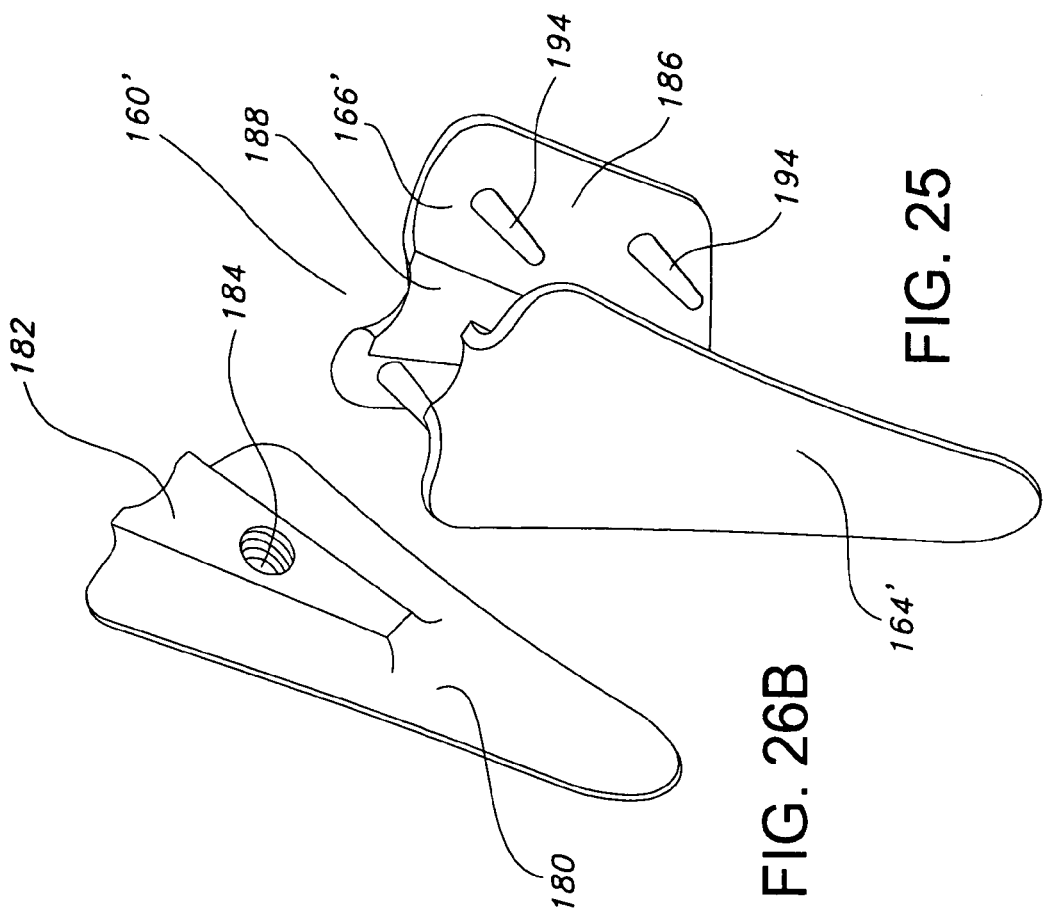
FIG. 25
FIG. 26B

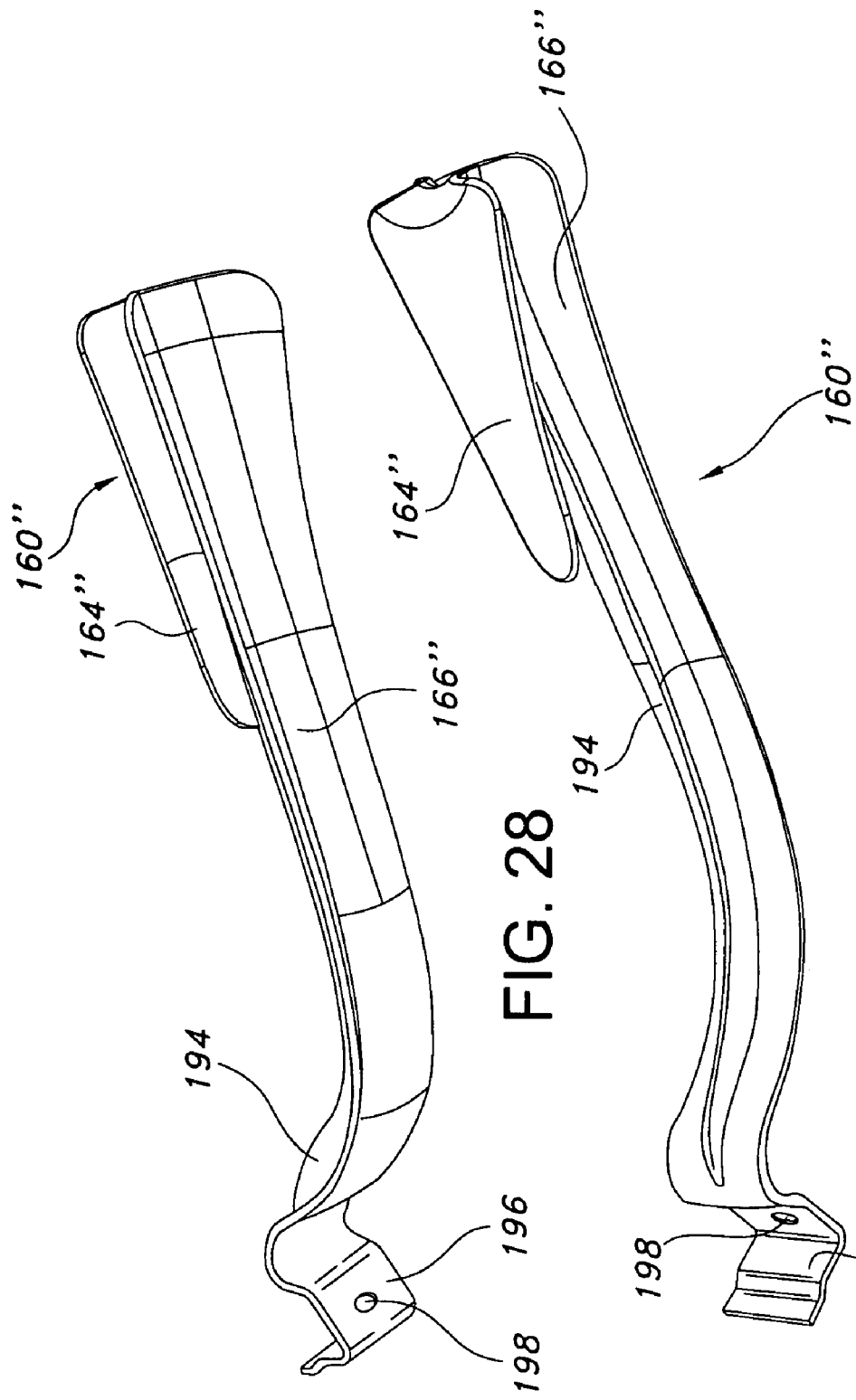

TRANSPORTATION SEATING SYSTEM

BACKGROUND OF THE INVENTION

The present invention relates to seating systems, and more particularly to transportation seating systems.

A wide variety of transportation seating systems have been developed for use in public transportation vehicles. Such vehicles include busses, subways, and streetcars. While the systems developed to date have gained widespread acceptance, there is a continuing need for improved systems which are simpler, less expensive, more functional, and safer.

SUMMARY OF THE INVENTION

The present invention is directed to a transportation seating system incorporating a variety of novel concepts.

In a first aspect of the invention, the seating system includes a frame assembly supporting one or more seat shells. The frame assembly in turn includes a seat beam and a beam support. The beam support includes a beam body and a connector inserted into the body. The connector and the body therefore are in compression under the weight of the system and the seating occupants. Further preferably, the seat beam and the beam support are hingedly interconnected, so that the frame can be 1) folded for shipment and storage or 2) unfolded for installation in a vehicle.

In a second aspect of the invention, the system includes a frame assembly supporting one or more seat shells. The frame assembly includes a seat beam for supporting the seat shells, and a beam support for supporting the seat beam. The beam support includes a beam body and a pair of connectors inserted into opposite ends of the body. The body defines a plurality of openings or receivers, and each connector defines a plurality of lugs each closely received within one of the openings. This structure provides a simple yet highly effective interconnection of the frame components.

In a third aspect of the invention, a unique connector system is provided between the seat beam and the beam support. More specifically, the seat beam defines at least one channel and includes a first connector slidably received within the channel. A second connector is outside the channel and adapted to be connected to the beam support. A fastener extends through the second connector and into the first connector to draw the two connectors together to secure the connectors in a fixed position along the length of the seat beam. The connection system enhances the adaptability and modularity of the system by enabling the seat beam and the beam support to be interconnected in a variety of relative positions. The connection system also enables the seat beam to be precisely horizontally installed regardless of potential variations in the supporting structure.

In a fourth aspect of the invention, the system includes a novel structure for interconnecting the seats and the seat beam. More specifically, the seat beam includes a front portion and a back portion. The seat includes an integral flange extending around the rear portion of the beam. A fastener extends through the seat and into the front portion of the beam. The interconnection is simple, effective, and safe. The ease of the interconnection also facilitates the modularity of the system and enables the seats to be easily installed after the installation of the frame assemblies, reducing the likelihood of seat damage during vehicle construction.

In a fifth aspect of the invention, two of the seats are mounted side-by-side on the seat beam. The seat backs taper and therefore define an upwardly opening v-shaped slot. A seat tie or filler is installed in the lower portion of the slot to prevent objects such as coat strings and buttons from becoming trapped in the slot. The tie also can be a structural component to assist in interconnecting and aligning the adjacent seat shells.

In a sixth aspect of the invention, the seat is an integral one-piece molded article. The seat includes a seat body and a grab rail extending from the seat body, preferably from the seat back. The one-piece construction provides seat and grab rail in a relatively simple and efficient construction without the requirement of multiple interconnected parts.

These and other objects, advantages, and features of the invention will be more fully understood and appreciated by reference to the description of the current embodiments and the drawings.

BRIEF DESCRIPTION OF THE DRAWINGS

FIG. 22 is a front perspective view of the seat tie;

FIG. 23 is a rear perspective view of the seat tie;

FIG. 24 is a sectional view taken along Line XXIV-XXIV in FIG. 20;

FIG. 25 is a front perspective view of a first alternative tie;

FIG. 26a is a rear elevational view of the first alternative tie;

FIG. 26b is a rear perspective view of the front piece of the first alternative tie;

FIG. 27 is a front perspective view of a second alternative seat tie;

FIG. 28 is a rear perspective view of the second alternative seat tie; and

DESCRIPTION OF THE CURRENT EMBODIMENTS

Figure 17:
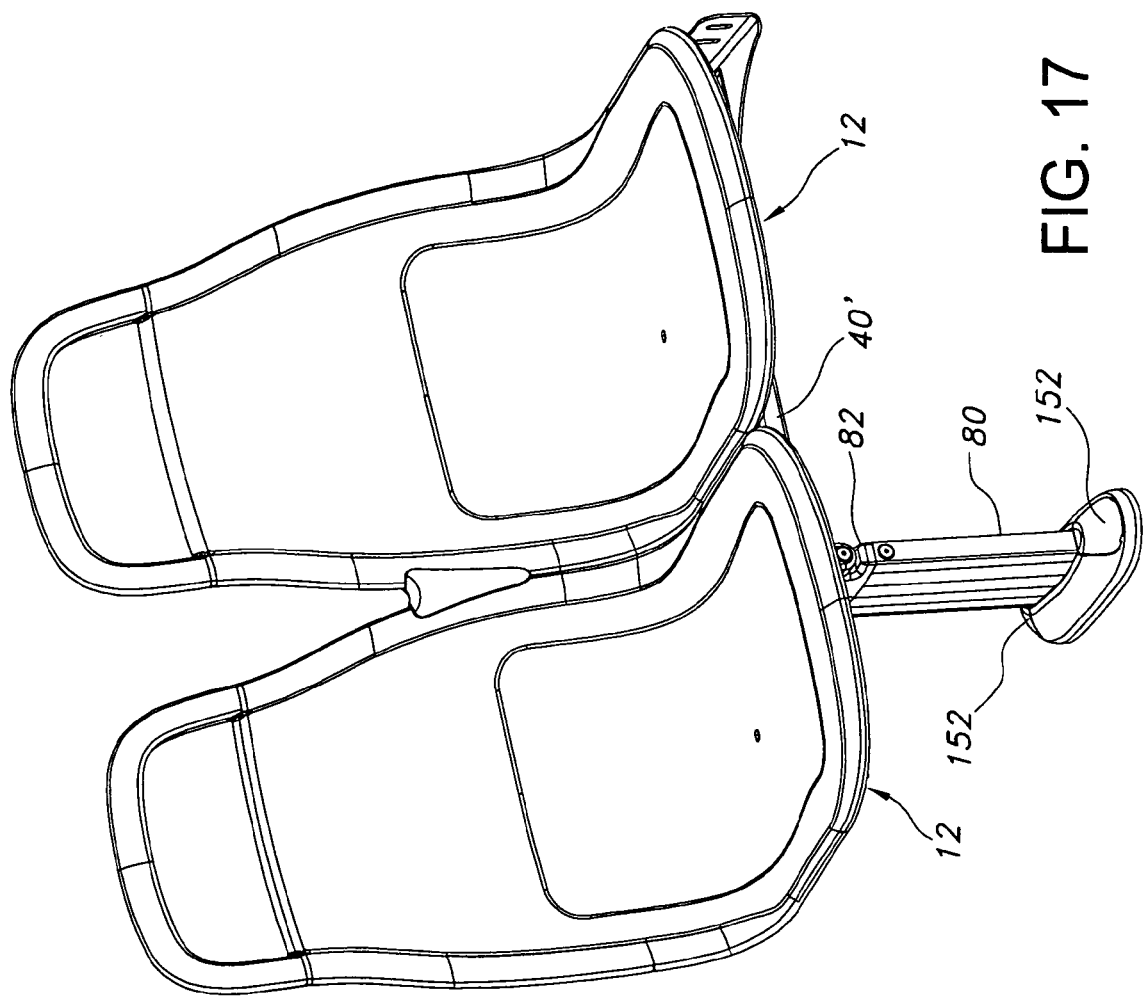
FIG. 17 is a upper perspective view of an alternative embodiment of the frame assembly in which the beam support is oriented vertically in a pedestal configuration.
Figure 18:
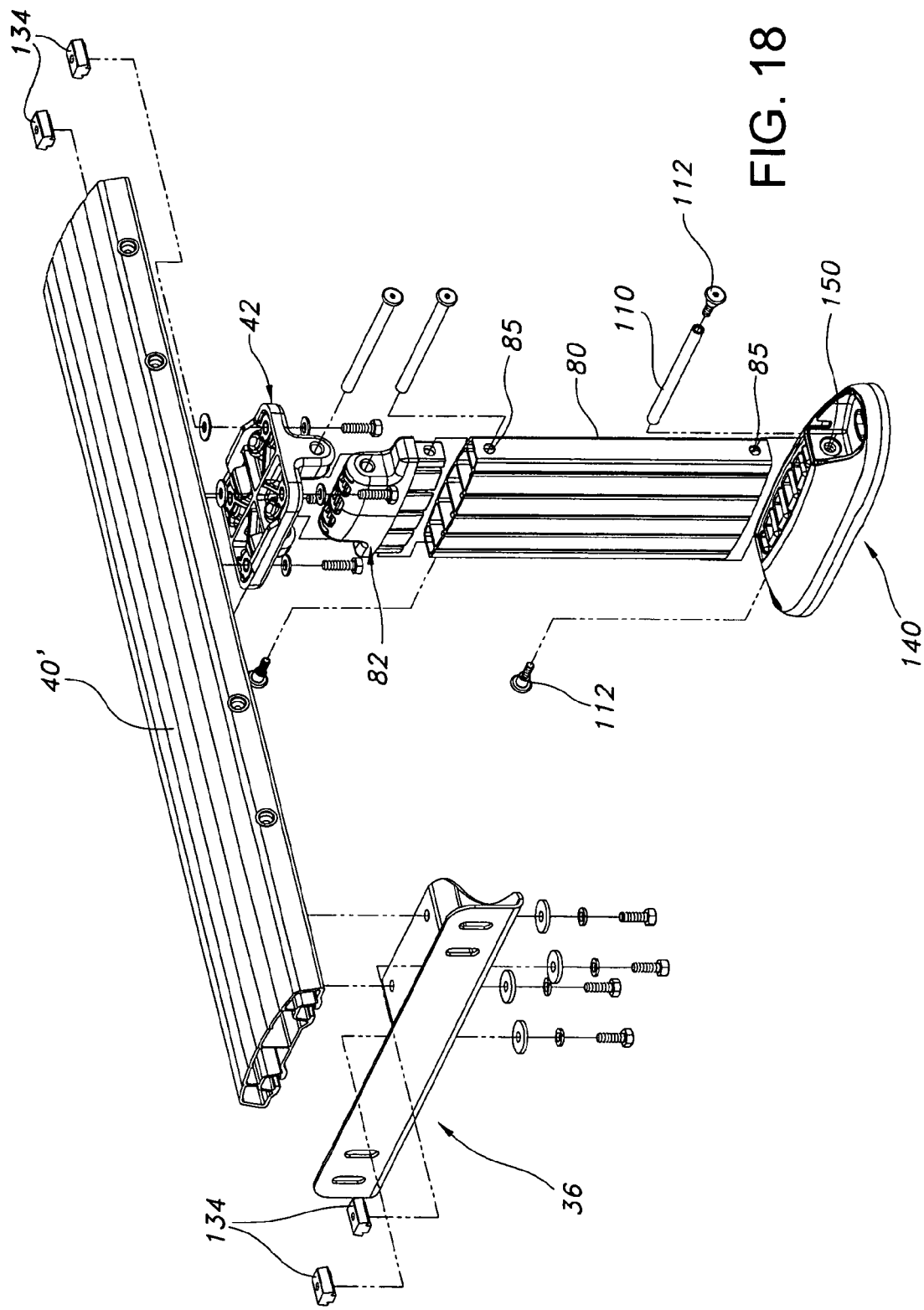
FIG. 18 is a upper exploded perspective view of the alternative frame assembly.

A transportation seating system constructed in accordance with a current embodiment of the invention is illustrated in the drawings and generally designated 10. The system includes seats 12 and a frame assembly or lower mounting group 14. The frame assembly 14 includes a seat beam 16 and a beam support 18. As illustrated in FIGS. 1-6, the beam support is angled in a cantilevered configuration. As illustrated in FIGS. 17-18, the beam support is vertical in a pedestal configuration. The frame assembly 14 is attached to structural components of a public transportation vehicle (not shown). The seats 12 are mounted on the frame assembly during factory production, or when the frame assembly is installed in the vehicle, or after the frame assembly is installed in the vehicle.

I. Seat

Each seat 12 is a one-piece integral molded component. The seat 12 includes a seat portion 20, a back portion 22, and a grab rail 24. The seat is injection molded of a glass-filled Nylon (i.e. polyamide) using gas-assist technology. Other appropriate materials and manufacturing techniques are and will be known to those skilled in the art. Optionally, the grab rail can include a stainless steel or other surface by including an appropriate insert in the mold. Onserts (upholstered or otherwise) or other seating surfaces can be included as will be appreciated by those skilled in the art. The appearance and construction of the seat shell are more fully illustrated in co-pending design Application No. 29/239,051 entitled TRANSPORTATION SEAT, filed on even date herewith (now U.S. Patent No. D553,373).

The seat back 22 includes a pair of opposite edges 26 and 28. The opposite edges taper toward one another along the height of the back portion 22. The taper provides increased hip clearance room in the aisle adjacent the seats 12. The grab rail 24 is integral with the remainder of the seat 12. Alternatively, the grab rail may be omitted for certain application, for example for a transverse seat.

The seat 12 includes an integral mount 30 on the underside of the seat portion 20. As perhaps best illustrated in FIG. 4, the mounting structure includes a rear flange 32 and a forward portion 34. The rear flange extends around the seat beam 16 as will be described, and the front portion 34 is attached to the seat beam also as will be described.

II. Frame Assembly or Lower Mounting Group

Figure 1:
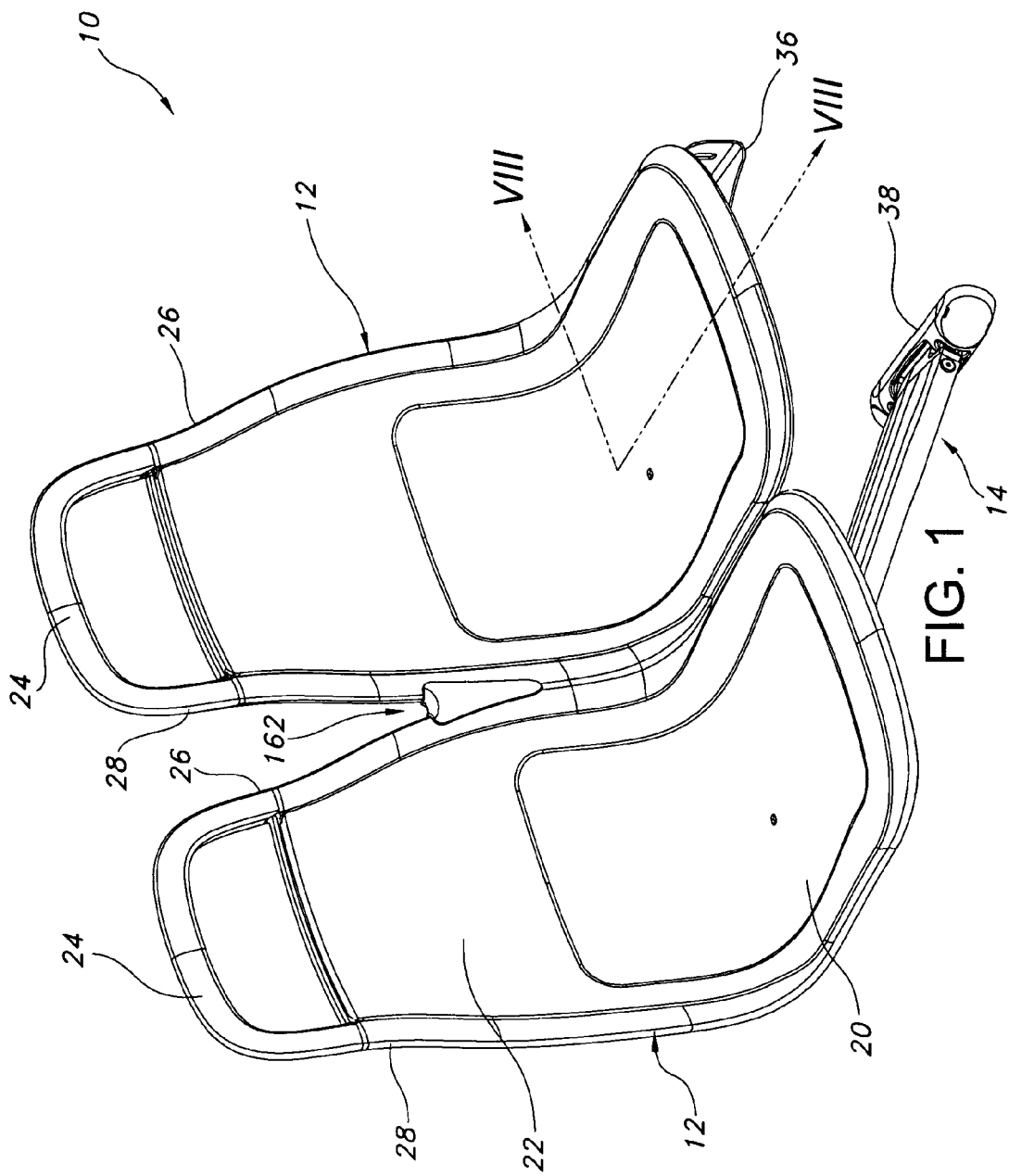
FIG. 1 is an upper perspective view of the transportation seating system of the present invention.
Figure 2:
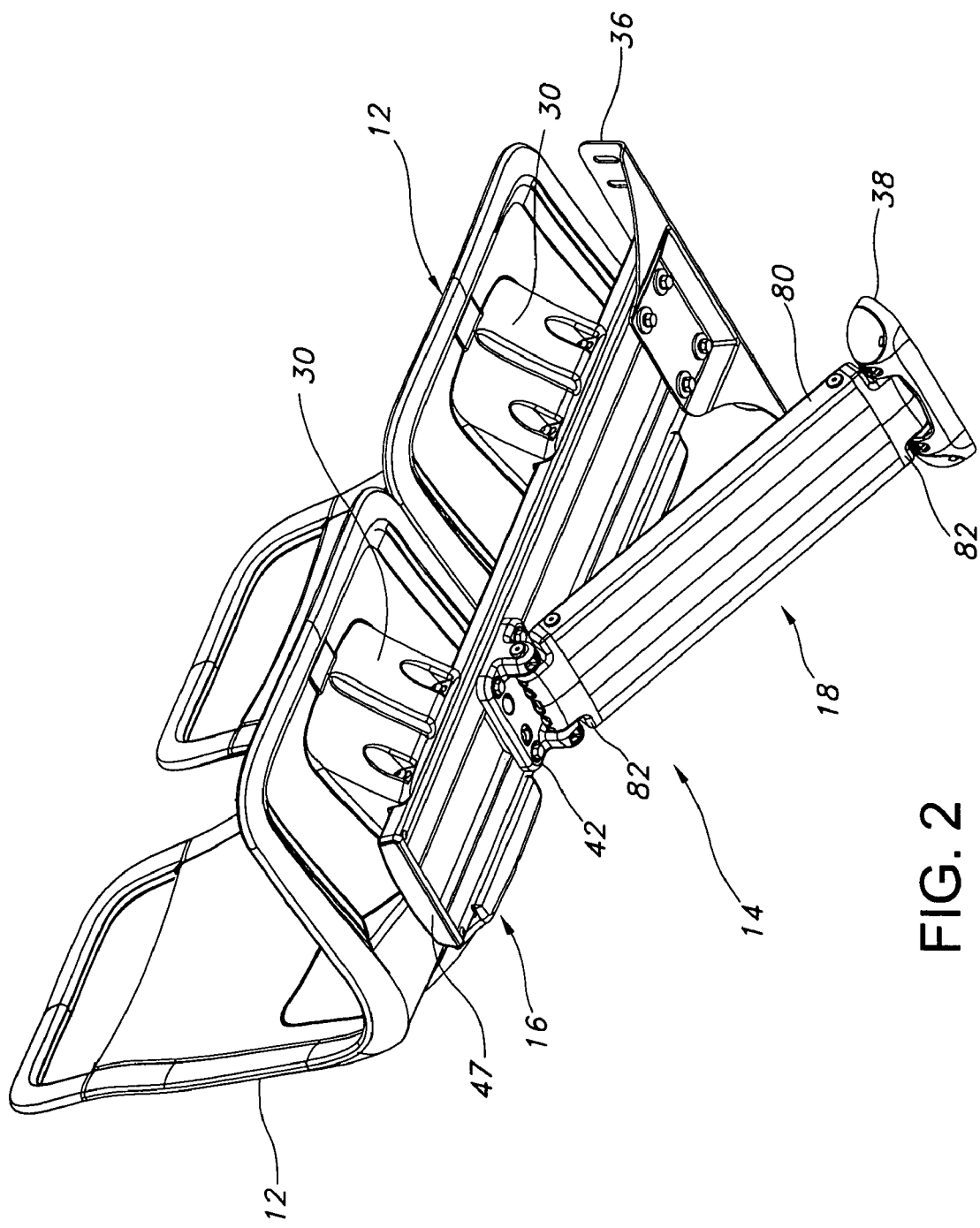
FIG. 2 is a lower front perspective view of the seating system.
Figure 3:
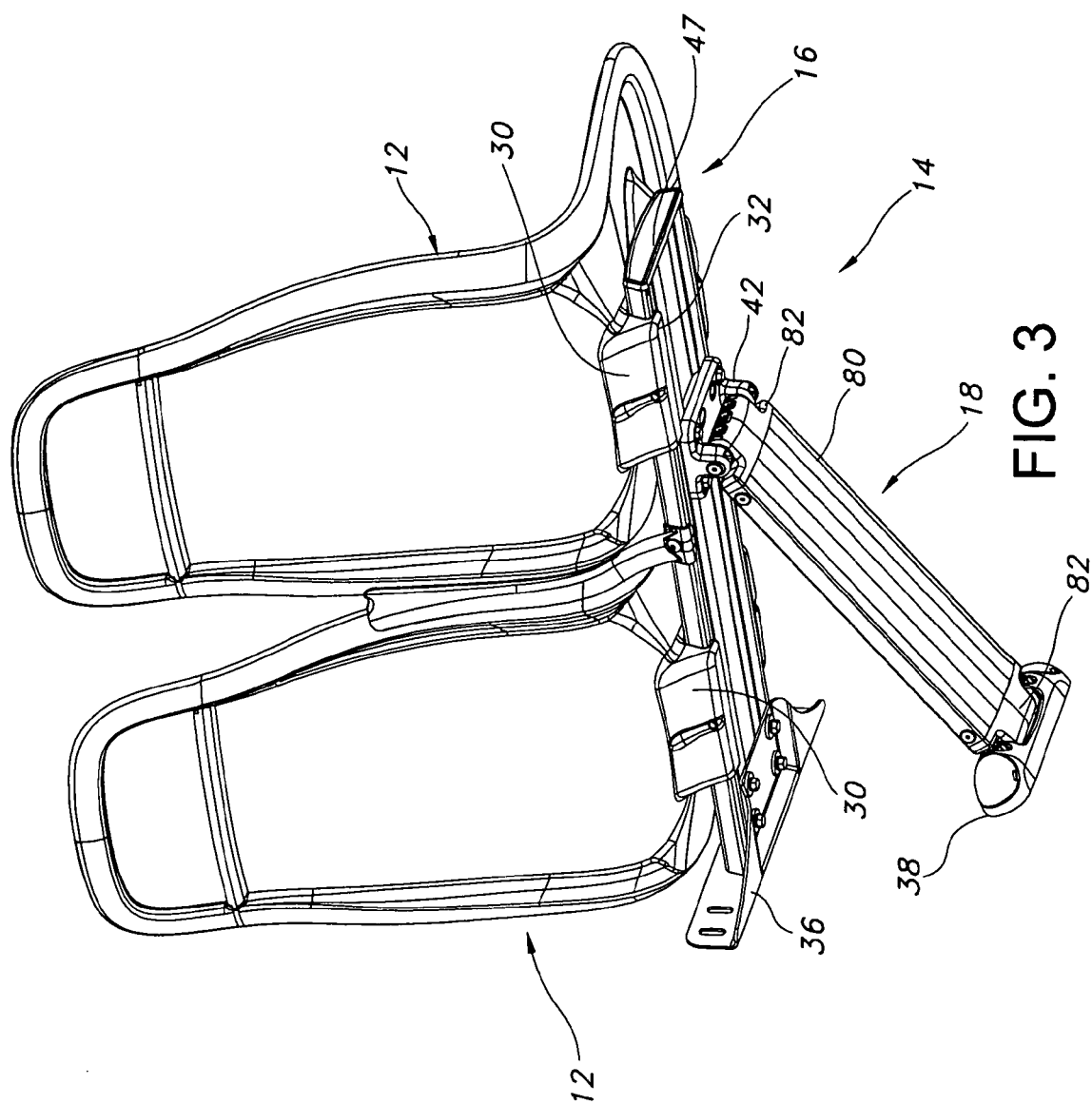
FIG. 3 is a lower rear perspective view of the seating system.
Figure 4:
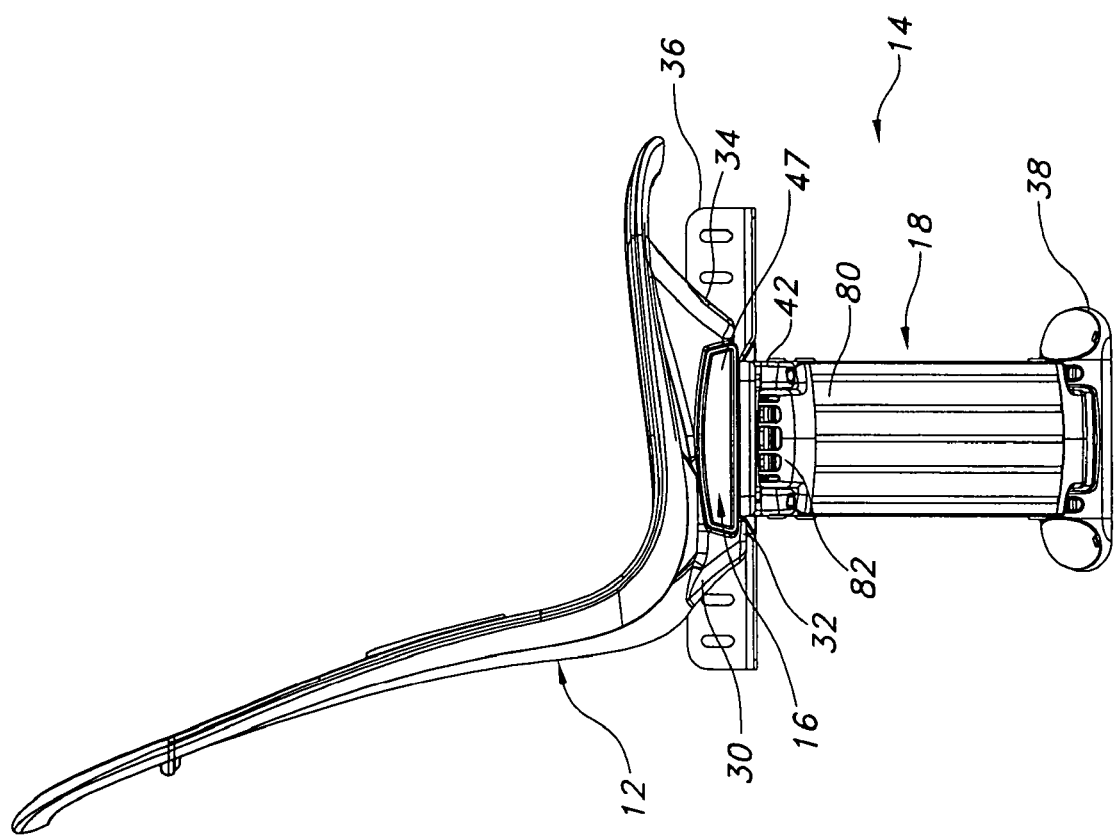
FIG. 4 is an end elevational view of the seating system.
Figure 5:
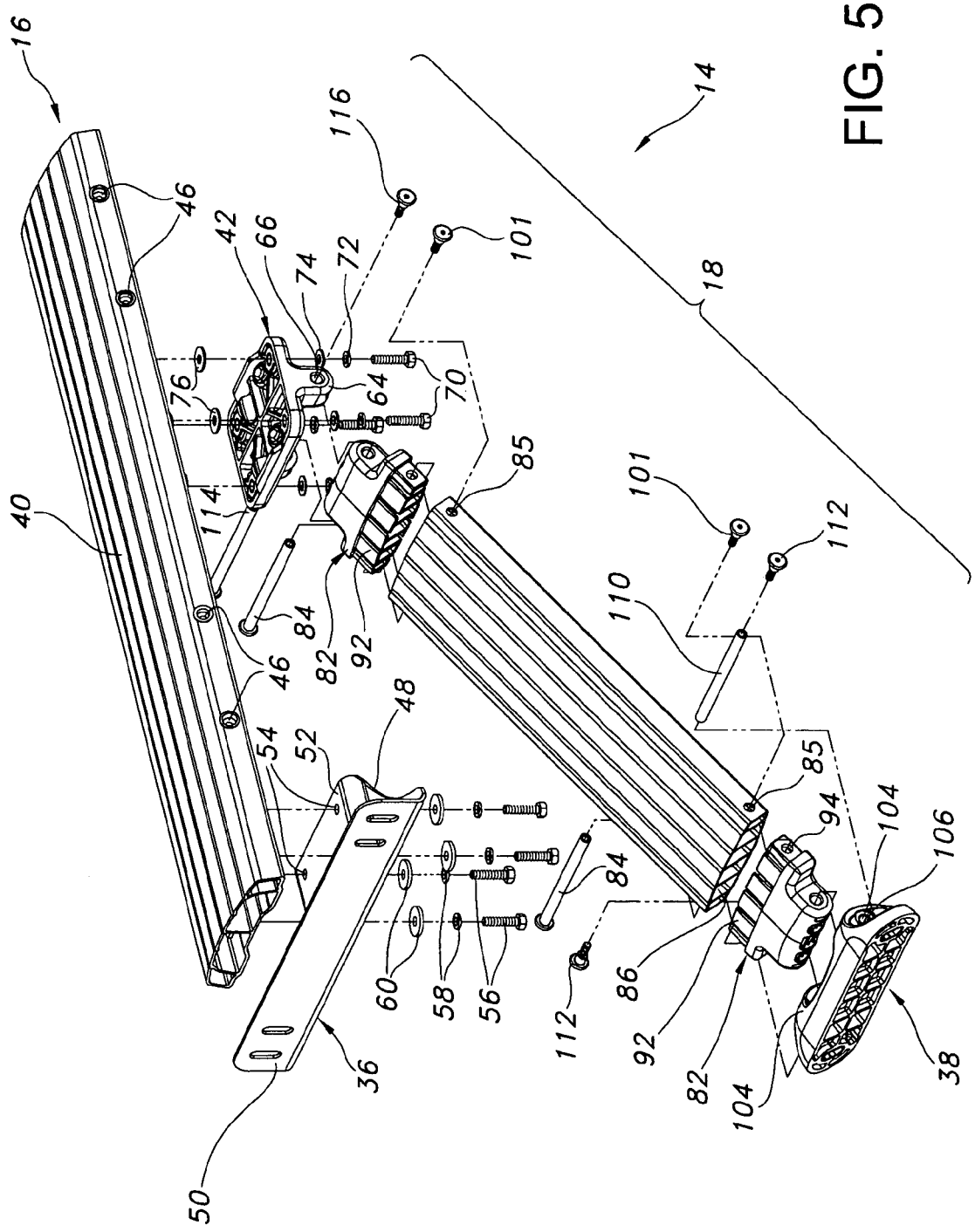
FIG. 5 is an upper exploded perspective view of the frame assembly.
Figure 6:
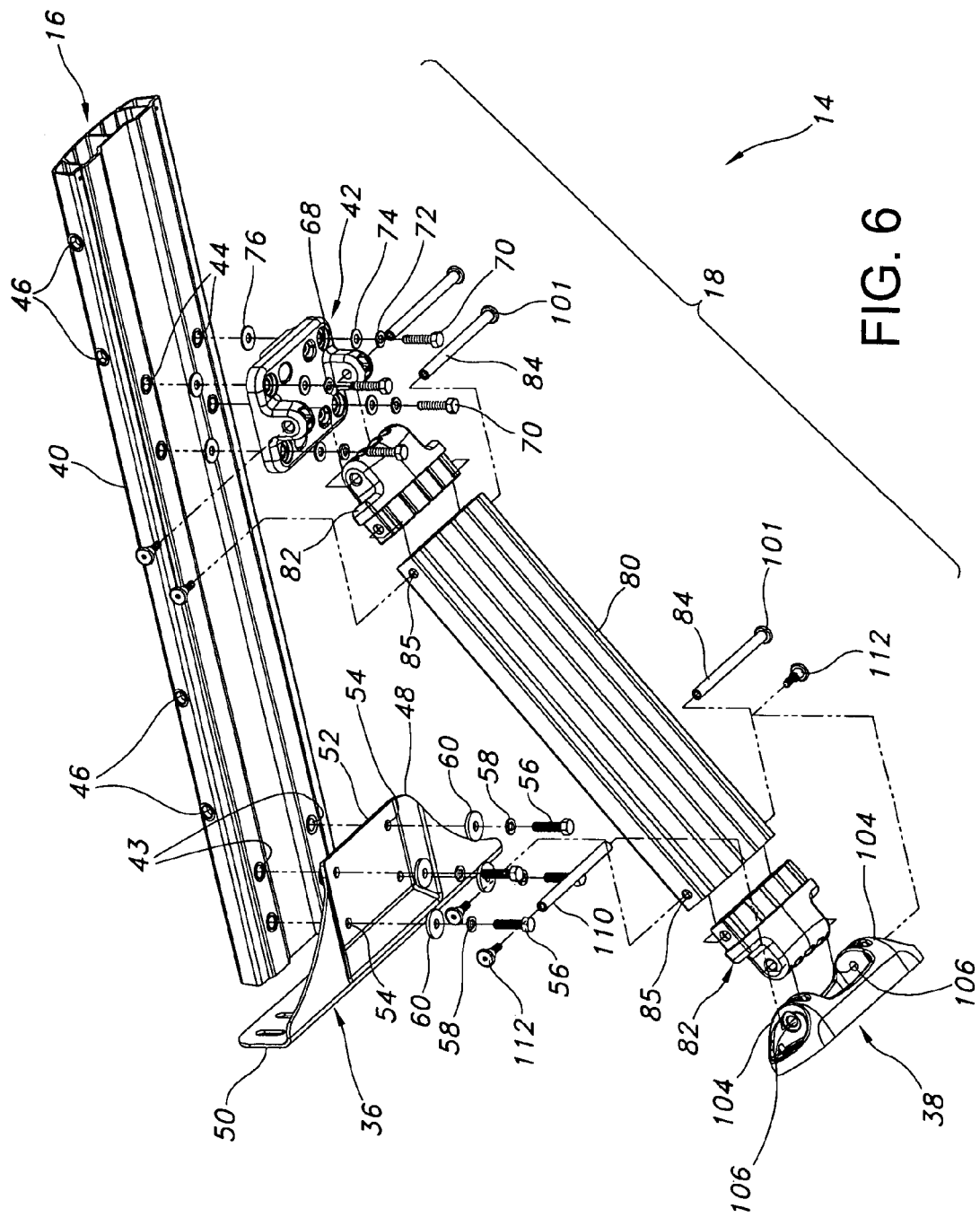
FIG. 6 is a lower exploded perspective view of the frame assembly.

The frame assembly or lower mounting group 14 is illustrated in perhaps greatest detail in FIGS. 5-6. The frame assembly includes the seat beam 16, the beam support 18, the seat beam bracket 36, and the base connector 38.

Figure 7:
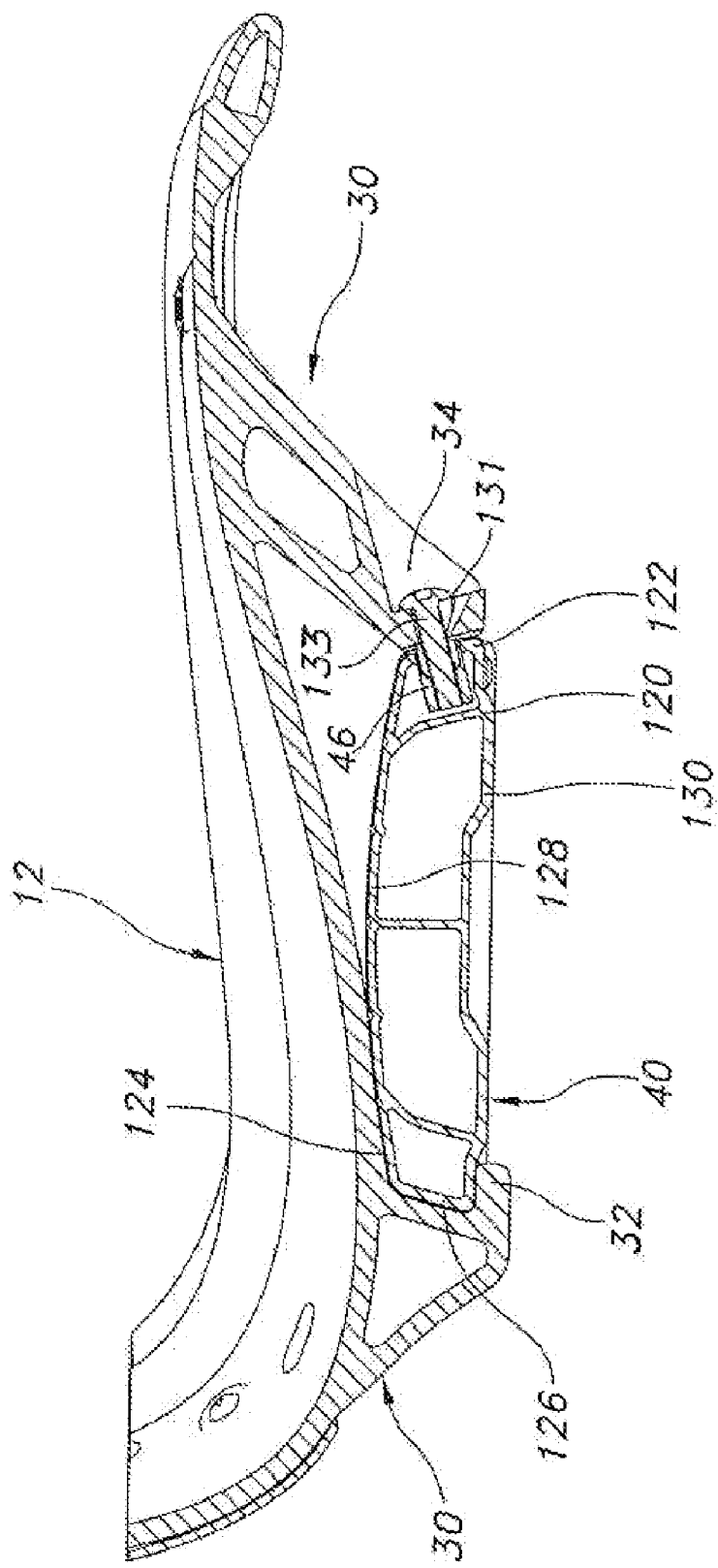
FIG. 7 is a sectional view taken along Line VII-VII in FIG. 1 showing the interconnection of the seat beam and the seat.

The seat beam 16 includes a seat beam body 40 extruded of aluminum and having the cross-section illustrated in FIG. 7. Other suitable materials are and will be known to those skilled in the art. The seat beam body 40 is drilled at various locations to receive rivet nuts (also knows as clinch nuts or cinch nuts) 43, 44, and 46. An end cap 47 of conventional construction (FIGS. 2-4) is inserted into the end of the seat beam body 40.

The seat beam bracket 36 includes a body portion 48 and a securing flange 50. The flange 50 is secured in conventional fashion to a vehicle frame or other structural component to support the seat beam 16 on the vehicle. The body 48 includes a connector plate 52 defining a plurality of holes 54. Bolts 56, lock washers 58, and flat washers 60 are used to interconnect the seat beam bracket 36 and the seat beam body 40. Specifically, the bolts 56 are threadedly received and secured within the rivet nuts 43.

Figure 10:
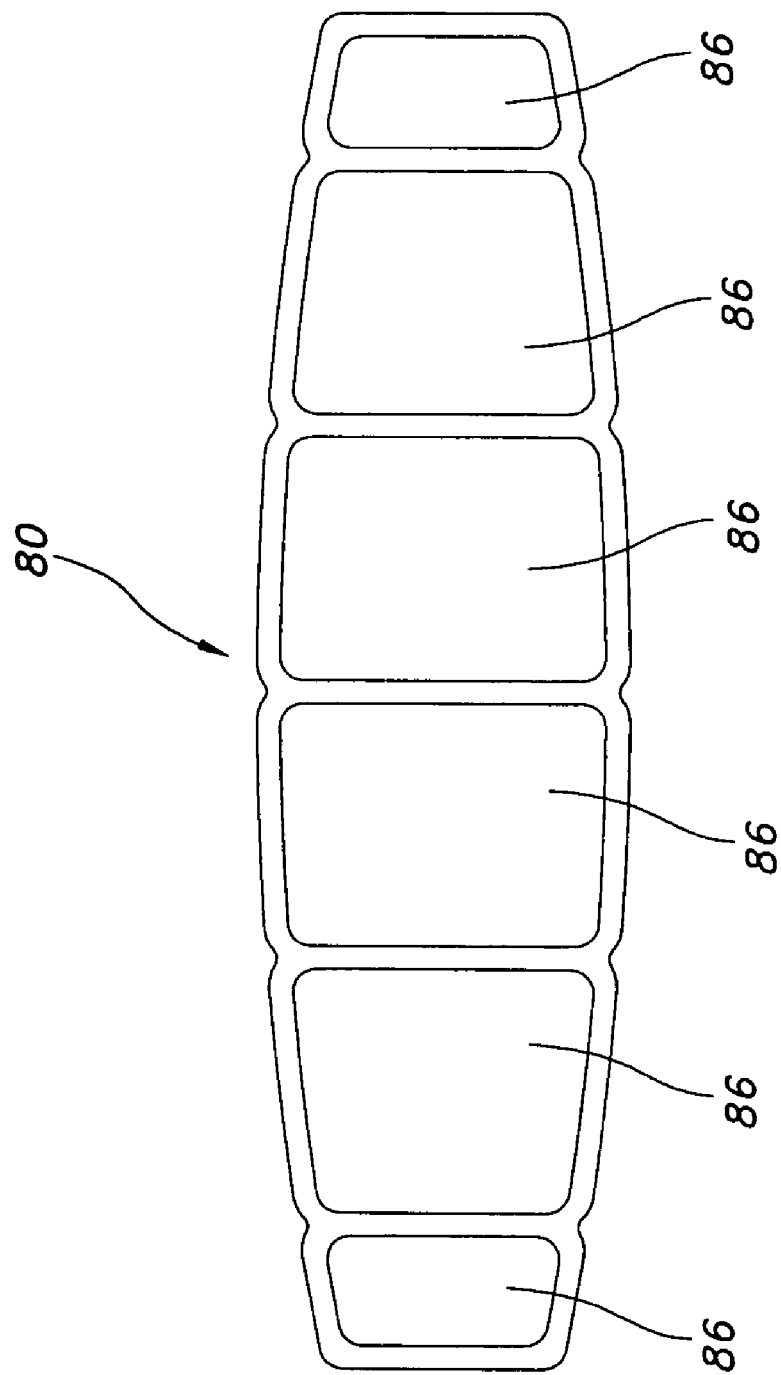
FIG. 10 is an end elevational view of the beam support body.

The beam support 18 includes a beam support body 80, a pair of beam support connectors 82, a pair of connector pins 84, and a hinge connector 42. The beam support body 80 is extruded of aluminum or other suitable material. The profile of the beam support body 80 is illustrated in FIG. 10. The beam support includes a plurality of openings, channels, or receivers 86, each of which receives a lug on one of the connectors 82 as will be described. The beam support also defines a transverse hole 85 at each of its opposite ends for receiving one of the pins 84.

Figure 11:
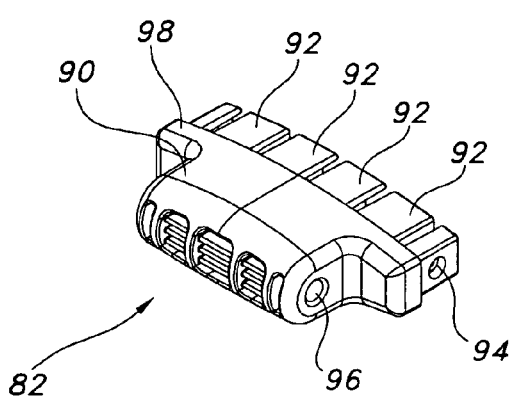
FIG. 11 is a perspective view of the beam support connector.
Figure 12:
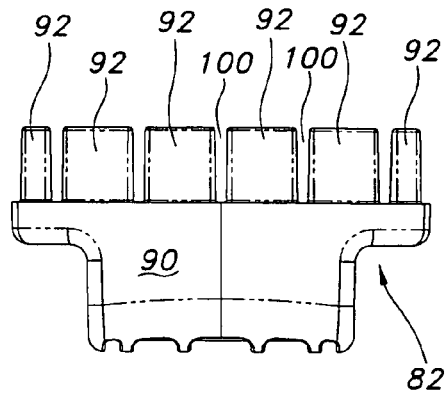
FIG. 12 is a top plan view of the beam support connector.
Figure 13:
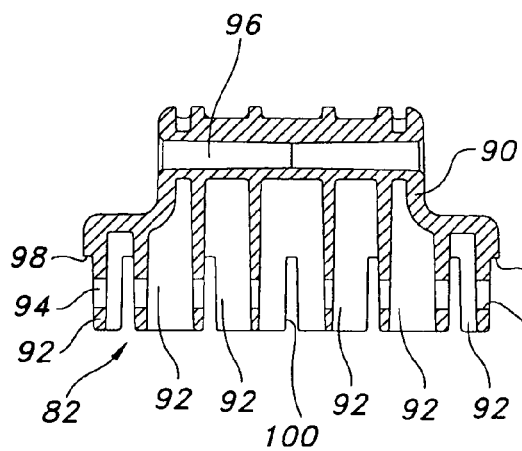
FIG. 13 is a sectional view of the beam support connector.
Figure 14:
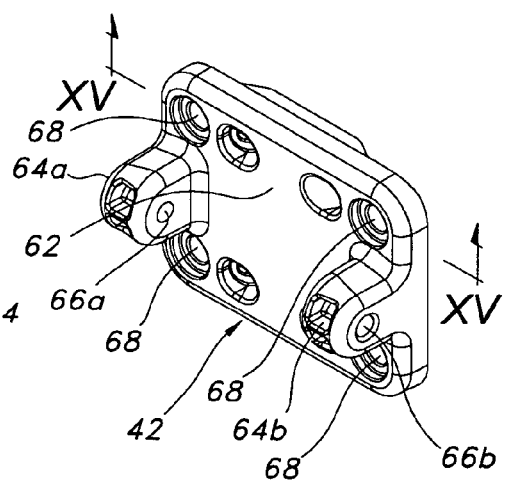
FIG. 14 is a perspective view of the hinge base.
Figure 15:
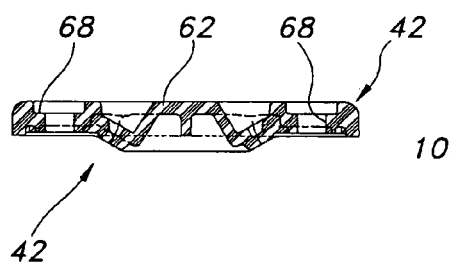
FIG. 15 is a sectional view taken along Line XV-XV in FIG. 14.
Figure 16:
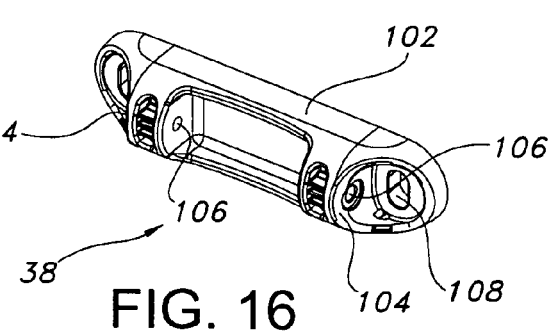
FIG. 16 is a perspective view of the base connector.

The beam support connector 82 is illustrated in perhaps greatest detail in FIGS. 11-13. The beam support connector includes a body 90 and a plurality of lugs 92 extending therefrom. Each lug 92 is dimensioned to be closely, or even tightly, received within one of the openings 86 in the beam support body 80 (see FIG. 10). The close or tight interfit between the lugs 92 and the beam support 80 provides a simple yet rigid interconnection. The lugs 92 collectively define a hole 94 for receiving a pin. The body 90 defines a hole 96 for receiving a connector pin. A shoulder 98 is located between the body 90 and the lugs 92 to abut the end of the beam support body 80. The depth of each slot 100 also is selected to engage the end of the beam support body 80.

Returning to FIGS. 5 and 6, pins 84 intersecure the beam support connectors 82 within the beam support body 80. More specifically, the pins 84 are inserted through the aligned holes 94 and 85. A cap screw 101 is secured in each end of each connector pin 84 to retain the pin in position.

The hinge connector 42 (FIGS. 5-6 and 14-15) is mounted on the underside of the seat beam body 40. The connector 42 includes a relatively flat body portion 62 and a pair of lugs 64a and 64b extending therefrom. Each lug 64 in turn defines a hole 66. The two holes 66a and 66b are aligned with one another for receiving a pin or other fastener as will be described. The body 62 includes four holes 68. Bolts 70 are inserted through the lock washers 72, the flat washers 74, and the holes 68 and into the rivet nuts 44 to secure the hinge connector 42 to the underside of the seat beam body 40. A plurality of flat washers 76 are included between the connector 42 and the body 40.

The base connector 38 (FIGS. 1-11 and 16) includes a base 102 and a pair of lugs 104 extending therefrom. The lugs 104 cooperatively defines a hole 106 to receive a pin or other fastener as will be described. The body 102 defines a pair of slotted apertures 108 for receiving fasteners (not shown) to connect the connector 102 to the frame or structural component of the vehicle.

A pin 110 (FIGS. 5-6) interconnects the connector 38 and the beam support connector 82. More specifically, the pin 110 is positioned within the aligned holes 96 in the beam support connector and 106 in the base connector. Cap screws 112 are inserted in the opposite ends of the connector pin 110 to complete the interconnection.

Similarly, the pin 114 interconnect the beam support 18 and the seat beam 16. More specifically, the pin 114 extends through the aligned holes 66 in the hinge connector and 96 in the beam support connector. Cap screws 116 are installed in the opposite ends of the pin 114 to complete the interconnection. Consequently, a single pin or fastener interconnects the seat beam 16 and the beam support 18. Similarly, a single pin or fastener interconnects the beam support 18 and the base connector 38.

Figure 8:
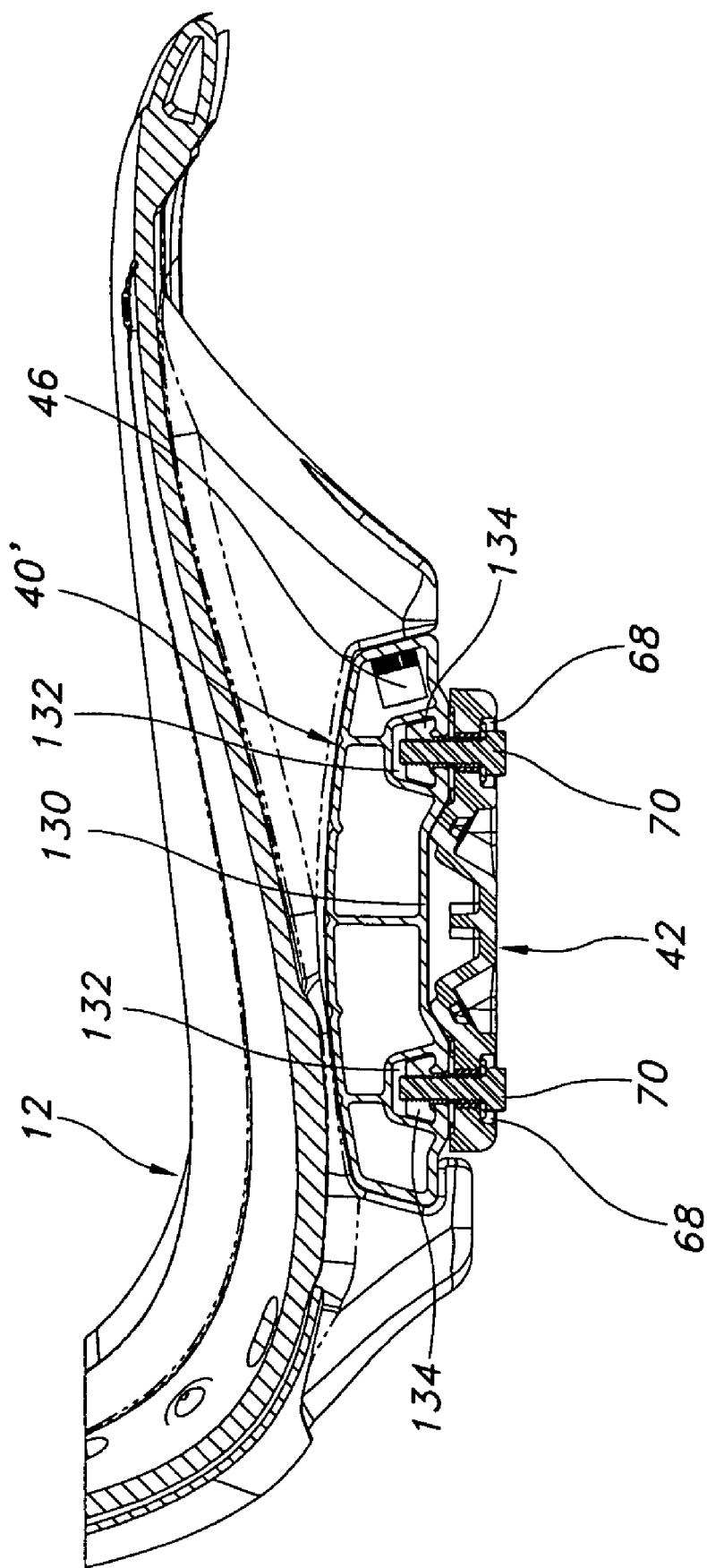
FIG. 8 is a sectional view similar to FIG. 7 showing the alternative interconnection of the seat beam and the beam support.
Figure 9:
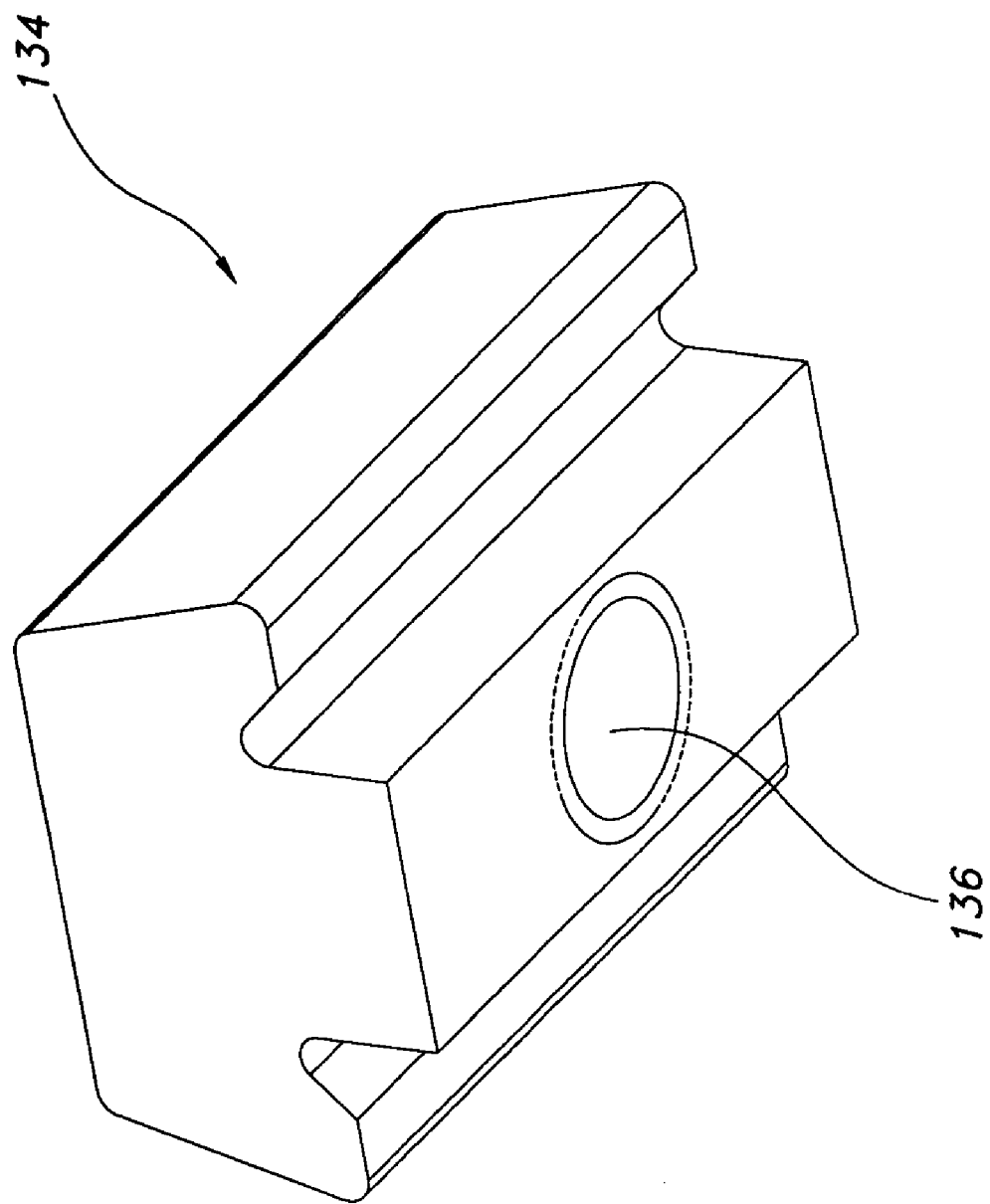
FIG. 9 is a perspective view of the T-nut used in the alternative connection system.

FIG. 8 illustrates an alternative construction for securing the hinge connector 42 to the beam body 40'. In the alternative construction, the beam body 40' defines a pair of channels 132 each opening through the lower surface 130. Two T-nuts 134 are slidably received within each of the channels 132. The T-nut 134 is illustrated in greater detail in FIG. 9. The T-nut includes a threaded bore 136 for receiving the fasteners 70. Consequently, the fasteners 70 extend through the hinge connector 42 and are secured within the T-nuts 134. As the fasteners are tightened, the connectors 42 and 134 are drawn together to clamp the beam body 40' therebetween. That clamping force is sufficient to retain the hinge connector 42 in position along the length of the beam body 40'. It also is possible to deform the body as a complement to, or in place of, the clamping connection. The FIG. 8 construction permits the hinge connector 42 to be positioned and secured at any point along the length of the seat beam body 40'. This facilitates installation and enables the seat beam to be aligned horizontally regardless of variations in the supporting structure.

Figure 19:
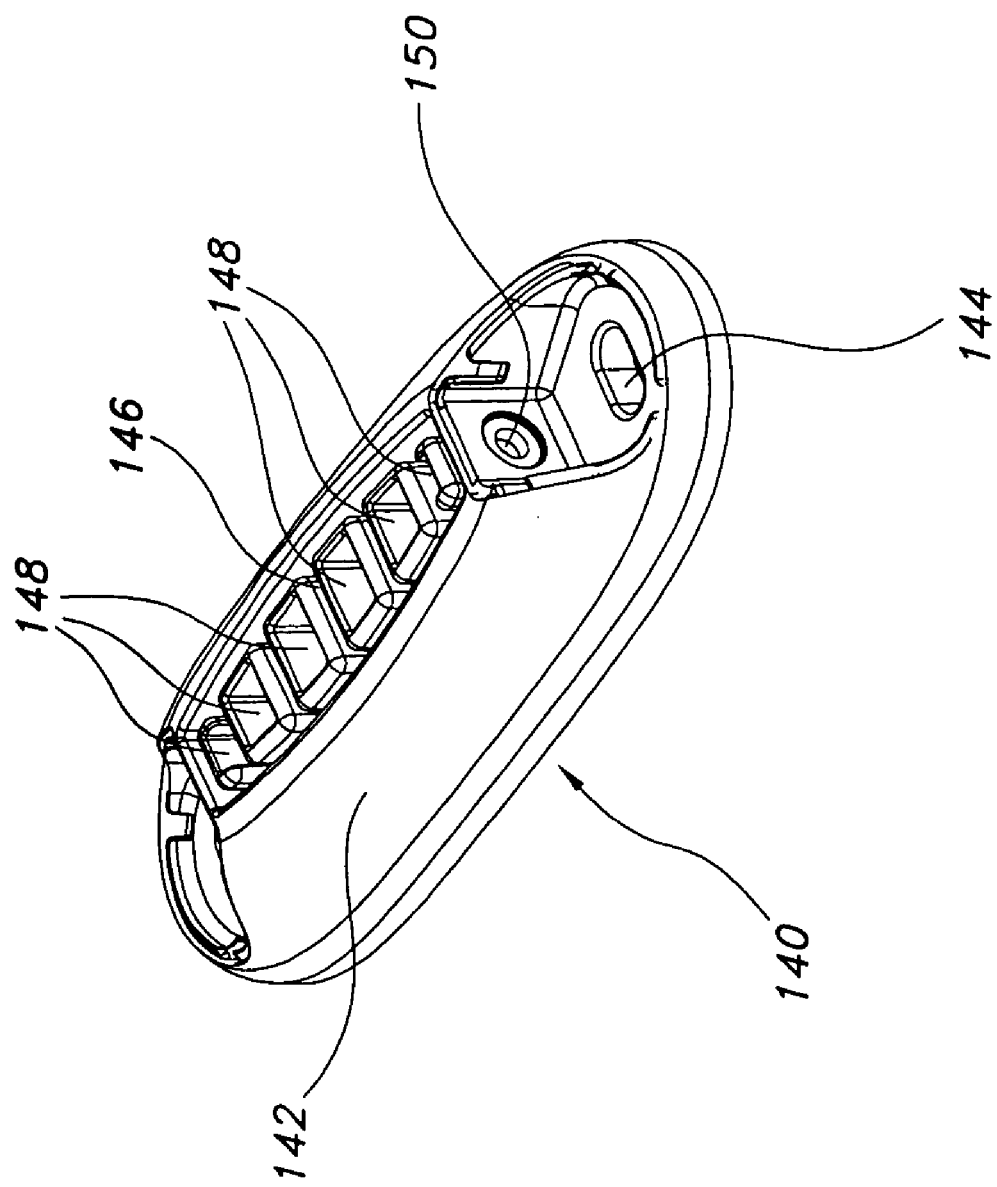
FIG. 19 is a perspective view of the pedestal foot base.
Figure 20:
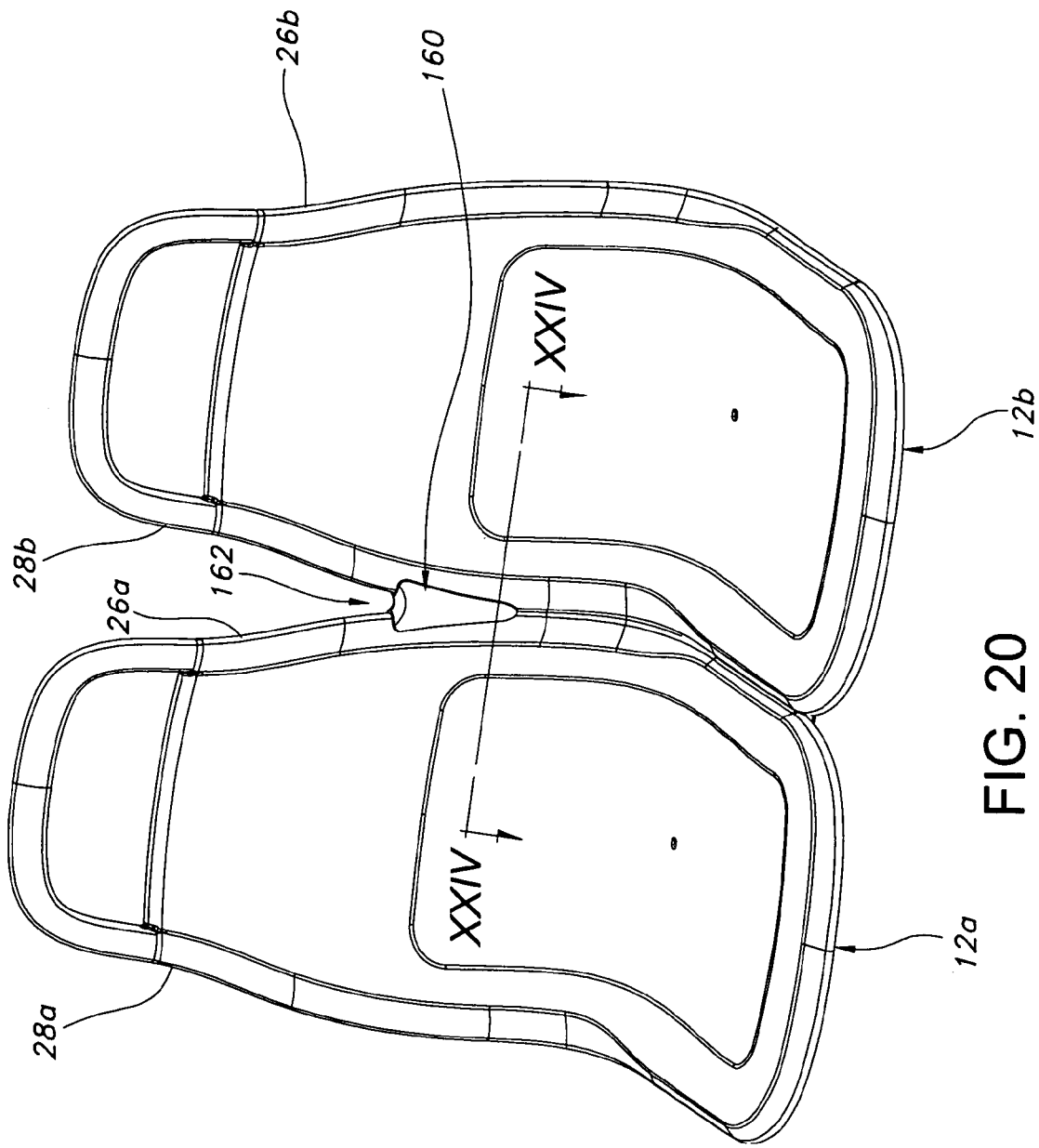
FIG. 20 is a perspective view of two adjacent seats and the seat tie.
Figure 21:
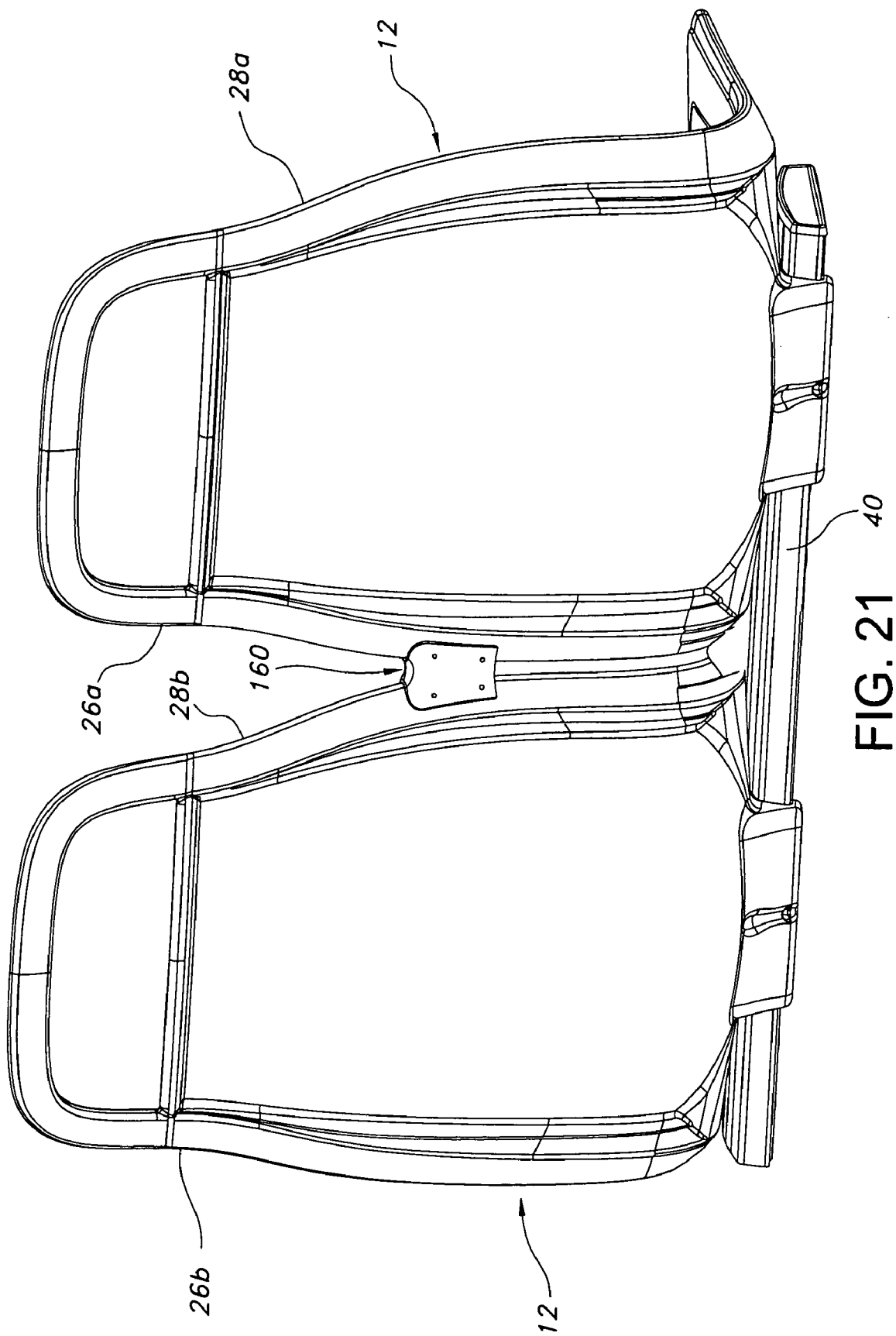
FIG. 21 is a rear perspective view of the two adjacent seats and the seat tie.

FIGS. 17-19 illustrate an alternative pedestal embodiment of the support frame in which the beam support 18 is oriented vertically. The only difference between the alternative embodiment and the previously described embodiments are 1) the beam support body 80 is shorter and oriented vertically and 2) the base connector 38 is replaced by the pedestal foot base 140. The unchanged elements are numbered similarly and will not be described in detail. Only the changes to the beam support body 80 and pedestal base 140 will be described in detail.

The pedestal base 140 is illustrated in greatest detail in FIGS. 18-19. The base or connector 140 includes a body 142 defining a pair of elongated attachment holes 144 at opposite ends thereof. The body also defines a recess 146 within which are positioned a plurality of lugs 148. The lugs 148 are sized and dimensioned to closely interfit with the openings 86 in the beam support body 80 (see also FIG. 10). Accordingly, the lugs 148 are dimensioned similarly to the lugs 92 on the beam support connector 82 (see FIGS. 11-13). Accordingly, the pedestal base and the beam support body 80 closely interfits to provide a secure rigid interconnection between the two. The connector pin 110 extends through the aligned hole 85 in the body 80 and the hole 150 in the base 140 to intersecure the pieces. Cap screws 112 are installed in the opposite ends of the pin 110 to retain the pin in position.

A pedestal base cap 152 is installed on the base 140 as illustrated in FIG. 17 to hide the fasteners (now shown) positioned therebelow and to prevent dirt or debris from collecting in this location. The caps 152 snap-fit into the base 140 in conventional fashion. Additional caps (not shown) are installed on the base connector 38 to cover the holes 108 and the mounting fasteners (not shown) extending therethrough.

III. Seat/Frame Interconnection

The interconnection of the seat 12 and the seat beam body 40 is perhaps best illustrated in FIG. 7. The seat beam body 40 includes a forward portion 120 terminating in a forward edge 122. Similarly, the body 40 includes a rear portion 124 terminating in a rear edge 126. The body also includes an upper surface 128 and a lower surface 130.

The rear flange 32 on the seat 12 extends downwardly around the rear portion 124 and rear edge 126 of the body 40 to engage the undersurface 130 of the body. The flange 32 therefore securely retains the back portion of the seat on the beam body 40. The forward portion 34 of the seat mount 30 defines an aperture 131 through which a screw 133 extends into the press nut 46. Therefore, the screw 133 anchors the forward portion 34 of the seat 12 to the forward portion 120, and more particularly to the forward edge 122, of the body beam 40. The lower surface of the mount 30 generally conforms to the upper surface 128 of the body beam 40. Consequently, the seat 12 conforms to the beam body 40 from the flange 32 to the forward portion 34.

As will be appreciated, the seats 12 can be readily installed on and removed from the seat beam 16. This enables the seats to be installed separately from the installation of the frame assemblies 14. This construction also enables seats to be easily replaced in case of damage or desired updating.

IV. Seat Tie

FIGS. 20-24 illustrate a first embodiment of an optional seat tie/connector 160, which may be included as a customer preference. If included, the tie is installed on and between a pair of adjacent seats 12a and 12b. The adjacent edges 26b and 28a of the adjacent seats define an upwardly opening V-shaped slot 162 which tapers to a point obscured in FIGS. 20-21 but visible in FIGS. 1 and 3. In the absence of the tie 160, the V-groove might catch coat drawstrings, buttons, buckles, and other objects worn by or carried by travelers. The tie 160 is inserted within the V-groove 162 to reduce the likelihood of catching such objects.

The tie is illustrated in greatest detail in FIGS. 22-23. Specifically, the tie includes a front plate 164 and a rear plate 166 defining a plurality of screw holes 168. The tie 160 is a molded article in which the front and rear plates 164 and 166 are portions of an integral unitary hole. The tie defines a pair of opposite grooves 170 for receiving and interfitting with the seat edges 26 and 28.

The tie 160 is installed after the seats have been mounted on the seat beam 16. More specifically, the tie is positioned in the slot 162 and then moved downwardly until further movement is prevented by the edges 26 and 28 of the adjacent seats 12. Screws or other fasteners (not shown) are installed through the holes 168 and into the seats 12 to retain the tie in position.

A first alternative embodiment of the optional seat tie is illustrated in FIGS. 25-26b. The seat tie 160' is fabricated as two separate portions rather than a single portion as in the previously described embodiment. The seat tie 160' includes a front portion 164' and a separate back portion 166'. The front portion 164' in turn includes a plate portion 180 and a rib 182 on its rear side defining a threaded socket 184. The back portion 166' includes a back plate 186 having a rib 188 defining a hole 190. A screw 192 is installed through the hole 190 and secured within the threaded socket 184 to intersecure the two portions 164' and 166' in the installed condition. A plurality of projections 194 extend generally perpendicularly from the rear of the back plate 186. The projections 194 extend into holes in the seats 12 to secure the seat tie 160' vertically. As with the previously described embodiment, the tie 160' is positioned in the lower portion or bottom of the slot 162 to reduce the likelihood that objects will be caught between the seats 12.

Figure 29:
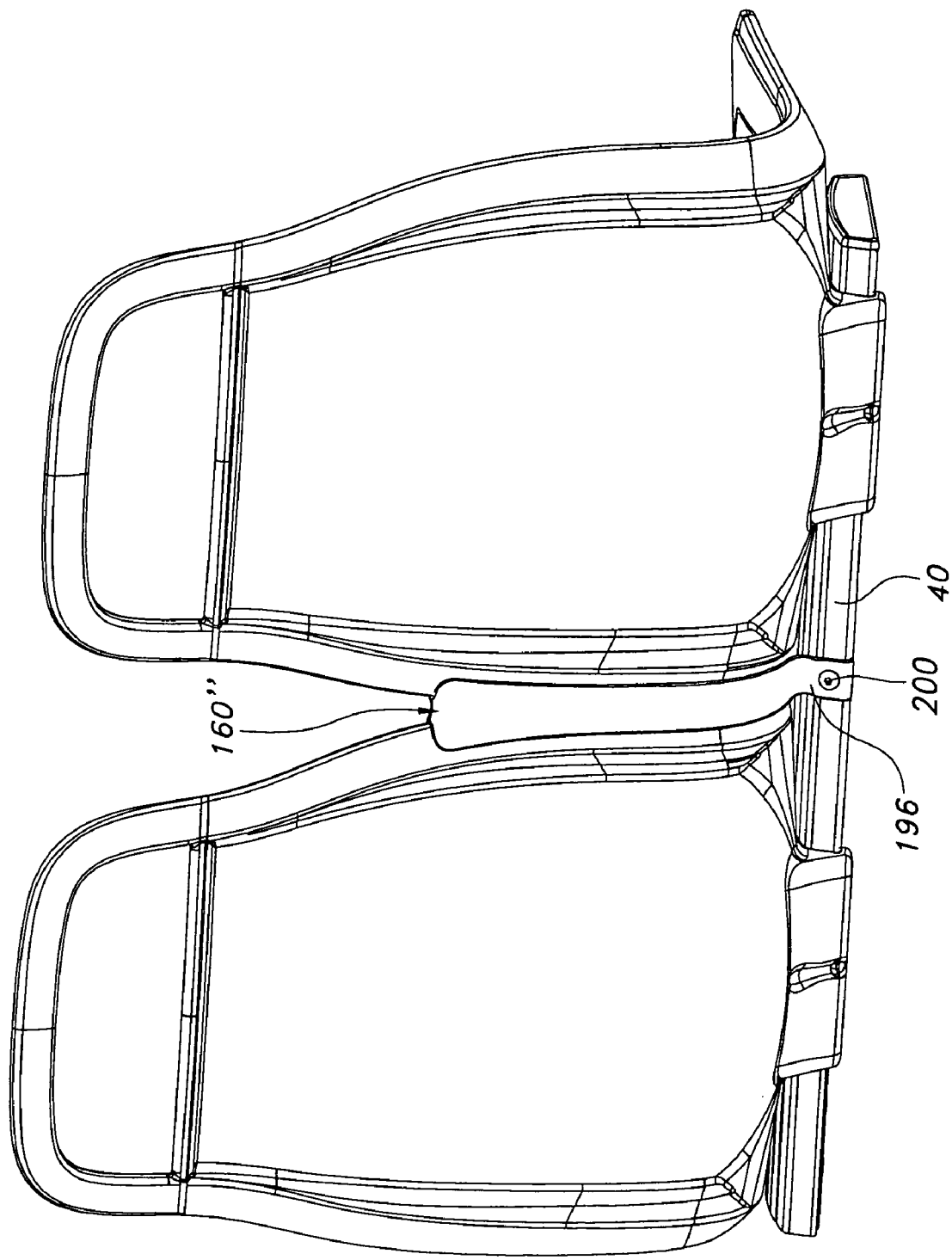
FIG. 29 is a rear perspective view of two adjacent seats including the second alternative seat tie.

A second alternative embodiment of the optional tie is illustrated in FIGS. 27-29. the alternative tie 160" includes a front plate 164" and a rear plate 166" interconnected by a rib 194. The rear plate 196 extends well below the bottom of the slot 162 and terminates in an end 196 that is shaped and dimensioned to interfit with the seat beam body 40. The lower end defines an attachment hole 198. FIG. 29 shows the tie 160" installed in the seat assembly. The upper portion of the seat tie is secured within the V-groove 162 as in the previous embodiments. The lower end 196 of the seat tie is secured to the seat beam body 40 using a screw 200. The retention of the lower end 196 to the seat beam body 40 retains the tie 160" in position.

The described transportation seating systems are modular, simple, efficient, and safe. The modular construction permits all of the components to be shipped from the manufacturing facility in an unassembled or "knock-down" condition. The seats may be compactly stacked within one another. The frames can be assembled easily on site within the transportation vehicle. The seats may be installed when the seat frames are installed or at another time thereafter. The postponed installation of seats enables the seat frames to be installed with less effort and without damaging the seats.

The above descriptions are those of current embodiments of the invention. Various alterations and changes can be made without departing from the spirit and broader aspects of the invention as defined in the appended claims, which are to be interpreted in accordance with the principles of patent law, including the doctrine of equivalents.

The invention claimed is:

1. A transportation seating assembly comprising:
   a seat;
   a seat beam adapted to support said seat;
   a support beam adapted to support said seat beam, said support beam including a body having first and second opposite ends, said support beam further including first and second connectors interfitted with said first and second ends respectively, said first and second connectors and said body being in compression supporting said seat beam, said support beam body being extruded and defining a plurality of hollow portions, each of said first and second connectors including a plurality of lugs, each of said lugs received closely within one of said hollow portions; and
   fastener means for hingedly interconnecting said seat beam and said first connector, said beams being movable about said fastener means between a collapsed position and a deployed position.

2. A transportation seating assembly as defined in claim 1 wherein:
   said seat beam includes a third connector defining a first hole;
   said first connector defines a second hole aligned with said first hole; and
   said fastener means comprises a fastener installed through said first and second holes.

3. A transportation seating assembly as defined in claim 2 wherein said support beam is cantilevered under said seat beam in the deployed position.

4. A transportation seating assembly as defined in claim 1 wherein the number of hollow portions and the number of lugs are the same.

5. A transportation seating assembly as defined in claim 1 wherein said body is metal and said first and second connectors are plastic.

6. A transportation seating assembly as defined in claim 1 wherein said second connector is adapted for connection to an attachment point on a vehicle.

7. A transportation seating frame comprising:
   a seat beam adapted to support a seat;
   a cantilever beam supporting said seat beam, said cantilever beam including a cantilever beam body having first and second ends, said cantilever beam further including first and second connectors interfitted with said first and second ends respectively, said first and second connectors and said cantilever beam body being under compression supporting said seat beam, said cantilever beam body being extruded and defining a plurality of hollow portions, each of said first and second connectors including a plurality of lugs each extending into one of said hollow portions; and
   a fastener hingedly interconnecting said seat beam and said first connector of said cantilever beam, whereby said beams are capable of movement between a folded position and an unfolded installation position.

8. A transportation seating frame as defined in claim 7 wherein said fastener comprises a single fastener.

9. A transportation seating assembly as defined in claim 7 wherein the number of hollow portions and the number of lugs are the same.

10. A transportation seating assembly as defined in claim 7 wherein said cantilever beam body is metal and said first and second connectors are plastic.

11. A transportation seating assembly as defined in claim 7 wherein said second connector is adapted for connection to an attachment point on a vehicle.

* * * * *